(12) United States Patent
Kojima

(10) Patent No.: US 9,366,308 B2
(45) Date of Patent: Jun. 14, 2016

(54) VIBRATION DAMPING DEVICE
(71) Applicant: BRIDGESTONE CORPORATION, Tokyo (JP)
(72) Inventor: Hiroshi Kojima, Yokohama (JP)
(73) Assignee: BRIDGESTONE CORPORATION, Tokyo (JP)
( * ) Notice: Subject to any disclaimer, the term of this patent is extended or adjusted under 35 U.S.C. 154(b) by 0 days.
(21) Appl. No.: 14/418,494
(22) PCT Filed: Jul. 17, 2013
(86) PCT No.: PCT/JP2013/069438
§ 371 (c)(1),
(2) Date: Jan. 30, 2015
(87) PCT Pub. No.: WO2014/021108
PCT Pub. Date: Feb. 6, 2014
(65) Prior Publication Data
US 2015/0184717 A1 Jul. 2, 2015
(30) Foreign Application Priority Data
Aug. 3, 2012 (JP) .................................. 2012-173184
(51) Int. Cl.
*F16F 9/14* (2006.01)
*F16F 13/08* (2006.01)
(Continued)
(52) U.S. Cl.
CPC ............... *F16F 13/08* (2013.01); *F16F 13/107* (2013.01); *F16F 13/18* (2013.01)
(58) Field of Classification Search
CPC ......... F16F 13/08; F16F 13/18; F16F 13/101; F16F 13/105; F16F 13/107; F16F 9/14
USPC ................. 267/140.11–140.13, 140.2–140.5, 267/141.1–141.7
See application file for complete search history.

(56) References Cited
U.S. PATENT DOCUMENTS
4,424,960 A 1/1984 Dan et al.
5,443,245 A 8/1995 Bellamy et al.
(Continued)

FOREIGN PATENT DOCUMENTS
CN 1831368 A 9/2006
CN 101165363 A 4/2008
(Continued)

OTHER PUBLICATIONS
Communication dated Aug. 17, 2015 from the State Intellectual Property Office of the People's Republic of China issued in corresponding application No. 201380040878.1.
International Search Report for PCT/JP2013/069438 dated Oct. 8, 2013.
Extended European Search Report issued in European Application No. 13826012.0 dated Apr. 18, 2016.

*Primary Examiner* — Christopher Schwartz
(74) *Attorney, Agent, or Firm* — Sughrue Mion, PLLC

(57) ABSTRACT

In a vibration damping device (10), a plurality of pressure-receiving liquid chambers (25, 26) of which portions of wall surfaces are constituted of an elastic body (14) are disposed within the first mounting member (12). The pressure-receiving liquid chambers (25, 26) include a pair of first pressure-receiving liquid chambers (25) that communicate with each other through a first limiting path (27), and a second pressure-receiving liquid chamber (26) that communicates with an auxiliary liquid chamber (28) through a second limiting path. The pair of first pressure-receiving liquid chambers (25) sandwich a second mounting member (13) therebetween. The second pressure-receiving liquid chamber (26) is arranged side by side with the second mounting member (13) in an orthogonal direction (D1) orthogonal to both an axial direction of the first mounting member (12) and a sandwiching direction (D2) in which the pair of first pressure-receiving liquid chambers (25) sandwich the second mounting member (13). The second mounting member (13) extends over the entire length of each of the pair of first pressure-receiving liquid chambers (25) and the second pressure-receiving liquid chamber (26) in the axial direction. The first limiting path (27) does not contact the auxiliary liquid chamber (28). According to the vibration damping device (10), the performance of the elastic body (14) can be easily maintained for a prolonged period of time.

10 Claims, 10 Drawing Sheets

(51) Int. Cl.
*F16F 13/10* (2006.01)
*F16F 13/18* (2006.01)

(56) References Cited

U.S. PATENT DOCUMENTS

| | | | |
|---|---|---|---|
| 8,308,147 B2* | 11/2012 | Kojima | F16F 13/107 267/140.12 |
| 2001/0011790 A1* | 8/2001 | Satori | F16F 13/105 267/140.13 |
| 2006/0097587 A1 | 5/2006 | Ichikawa et al. | |
| 2008/0093785 A1 | 4/2008 | Muramatsu | |
| 2011/0042870 A1* | 2/2011 | Kojima | F16F 13/10 267/140.11 |
| 2013/0161883 A1* | 6/2013 | Nishi | F16F 13/101 267/140.13 |
| 2014/0159290 A1* | 6/2014 | Kojima | F16F 13/08 267/140.13 |

FOREIGN PATENT DOCUMENTS

| | | |
|---|---|---|
| DE | 100 24 535 A1 | 12/2001 |
| EP | 0 248 714 A1 | 12/1987 |
| EP | 0 300 090 A2 | 1/1989 |
| EP | 0 503 654 A2 | 9/1992 |
| JP | 60-168931 A | 9/1985 |
| JP | 63-61533 B2 | 11/1988 |
| JP | 3-72135 U | 7/1991 |
| JP | 6-22641 U | 3/1994 |
| JP | 7-158687 A | 6/1995 |
| JP | 8-93838 A | 4/1996 |
| JP | 9-14334 A | 1/1997 |
| JP | 2002-327788 A | 11/2002 |

* cited by examiner

VIBRATION DAMPING DEVICE

CROSS REFERENCE TO RELATED APPLICATIONS

This application is a National Stage of International Application No. PCT/JP2013/069438 filed Jul. 17, 2013, claiming priority based on Japanese Patent Application No. 2012-173184 filed Aug. 3, 2012, the contents of all of which are incorporated herein by reference in their entirety.

TECHNICAL FIELD

The present invention relates to a vibration damping device.

Priority is claimed on Japanese Patent Application No. 2012-173184, filed Aug. 3, 2012, the content of which is incorporated herein by reference.

BACKGROUND ART

In the related art, for example, a vibration damping device as illustrated in the following PTL 1 is known. This vibration damping device includes a tubular first mounting member that is coupled to any one of a vibration generating portion and a vibration receiving portion, a second mounting member that is coupled to the other of the vibration generating portion and the vibration receiving portion and is inserted through the first mounting member, and an elastic body that couples both of the mounting members together. A plurality of pressure-receiving liquid chambers, in which a liquid is enclosed and of which portions of the wall surfaces are constituted of the elastic body, are disposed within the first mounting member. The pressure-receiving liquid chambers have a pair of first pressure-receiving liquid chambers that communicate with each other through a first limiting path and a second pressure-receiving liquid chamber that communicates with an auxiliary liquid chamber, in which the liquid is enclosed, through the second limiting path. The pair of first pressure-receiving liquid chambers sandwich the second mounting member therebetween. The second pressure-receiving liquid chamber is arranged side by side with the second mounting member in the axial direction of the first mounting member. This vibration damping device absorbs and damps vibration along both the axial direction and a direction in which the pair of first pressure-receiving liquid chambers sandwich the second mounting member.

CITATION LIST

Patent Literature

[PTL 1] Japanese Unexamined Patent Application, First Publication No. 2002-327788

SUMMARY OF INVENTION

Technical Problem

However, in the related-art vibration damping device, there is room for improvement in achieving a long service life in the elastic body.

The present invention has been made in view of the aforementioned situations, and an object thereof is to provide a vibration damping device that can easily maintain the performance of an elastic body for a prolonged period of time.

Solution to Problem

In order to solve the above problems, the present invention suggests the following means. A vibration damping device related to the present invention includes a tubular first mounting member that is coupled to any one of a vibration generating portion and a vibration receiving portion; a second mounting member that is coupled to the other of the vibration generating portion and the vibration receiving portion and is inserted through the first mounting member; and an elastic body that couples both of the mounting members together. A plurality of pressure-receiving liquid chambers, in which a liquid is enclosed and of which portions of the wall surfaces are constituted of the elastic body, are disposed within the first mounting member. The pressure-receiving liquid chambers have a pair of first pressure-receiving liquid chambers that communicate with each other through a first limiting path and a second pressure-receiving liquid chamber that communicates with an auxiliary liquid chamber, in which the liquid is enclosed, through the second limiting path. The pair of first pressure-receiving liquid chambers sandwich the second mounting member therebetween. The second pressure-receiving liquid chamber is arranged side by side with the second mounting member in an orthogonal direction orthogonal to both an axial direction of the first mounting member and a sandwiching direction in which the pair of first pressure-receiving liquid chambers sandwich the second mounting member. The second mounting member extends over the entire length of each of the pair of first pressure-receiving liquid chambers and the second pressure-receiving liquid chamber in the axial direction. The first limiting path does not contact the auxiliary liquid chamber.

In this invention, if vibration in the sandwiching direction is applied to this vibration damping device, the first mounting member and the second mounting member are relatively displaced in the sandwiching direction while elastically deforming the elastic body. Accordingly, the pair of first pressure-receiving liquid chambers are separately expanded/contracted, whereby the liquid flows through the first limiting path, and the vibration is absorbed and damped.

Additionally, if vibration in the orthogonal direction is applied to this vibration damping device, the first mounting member and the second mounting member are relatively displaced in the orthogonal direction while elastically deforming the elastic body. Accordingly, the second pressure-receiving liquid chamber is expanded/contracted, whereby the liquid flows through the second limiting path between the second pressure-receiving liquid chamber and the auxiliary liquid chamber, and the vibration is absorbed and damped.

Here, since the second mounting member extends over the entire length of each of the pair of first pressure-receiving liquid chambers and the second pressure-receiving liquid chamber in the axial direction, when vibration in the sandwiching direction and vibration in the orthogonal direction are applied to this vibration damping device, the first mounting member and the second mounting member are relatively displaced in the sandwiching direction and the orthogonal direction, so that the pressure-receiving liquid chambers can be significantly deformed and expanded/contracted over the entire length thereof in the axial direction. Accordingly, it is possible to significantly and easily expand/contract each pressure-receiving liquid chamber while preventing the local elastic deformation of the elastic body. As a result, a load applied to the elastic body can be prevented from occurring so as to easily maintain the performance of the elastic body for a prolonged period of time.

Additionally, since the first limiting path does not contact the auxiliary liquid chamber, the pair of first pressure-receiving liquid chambers can communicate with each other through the first limiting path alone without using the auxiliary liquid chamber. Accordingly, vibration having a large amplitude in the vibration in the sandwiching direction can be effectively and easily damped, compared to, for example, a case where the pair of first pressure-receiving liquid chambers communicate with each other through the first limiting path and the auxiliary liquid chamber, or the like.

Additionally, the first mounting member may include a pair of first wall portions that extends in the orthogonal direction and are arranged at a predetermined distance in the sandwiching direction; and a pair of second wall portions that extend in the sandwiching direction, which are arranged at a predetermined distance in the orthogonal direction, and couple ends of the pair of first wall portions in the orthogonal direction together.

In this case, since the first mounting member includes the pair of first wall portions, the ends of the first pressure-receiving liquid chambers on the outside in the sandwiching direction can be significantly extended in the orthogonal direction so as to lie along the first wall portions. Accordingly, the first pressure-receiving liquid chambers can be enlarged, compared to, for example, a case where the first mounting member is formed in a cylindrical shape having an internal diameter equal to the spacing between the pair of first wall portions. Accordingly, when vibration in the sandwiching direction is applied, it is possible to increase the amount of expansion/contraction of the first pressure-receiving liquid chambers. As a result, damping performance can be reliably exhibited.

Additionally, since the first mounting member includes the pair of second wall portions, the ends of the second pressure-receiving liquid chambers on the outside in the orthogonal direction can be significantly extended in the sandwiching direction so as to lie along the second wall portions. Accordingly, the second pressure-receiving liquid chambers can be enlarged, compared to, for example, a case where the first mounting member is formed in a cylindrical shape having an internal diameter equal to the spacing between the pair of second wall portions. Accordingly, when vibration in the orthogonal direction is applied, it is possible to increase the amount of expansion/contraction of the second pressure-receiving liquid chambers. As a result, damping performance can be reliably exhibited.

Moreover, since the first mounting member includes the first wall portions and the second wall portions, the sandwiching direction and the orthogonal direction are easily identified. As a result, the handlability of this vibration damping device can be improved.

Additionally, the elastic body may include a partitioning portion that partitions the first pressure-receiving liquid chambers and the second pressure-receiving liquid chamber in a circumferential direction of the first mounting member. The partitioning portion may extend in both directions that incline with respect to the sandwiching direction and the orthogonal direction from the first mounting member in a front view when this vibration damping device is viewed from the axial direction, and may be coupled to the second mounting member.

In this case, since the partitioning portion extends in the inclining directions from the first mounting member in the front view and is coupled to the second mounting member, the partitioning portion can be easily formed so as to be longer than that in a case where the partitioning portion extends in the sandwiching direction or the orthogonal direction. Accordingly, when the partitioning portions are elastically deformed, it is possible to decentralize a load applied to the partitioning portion to the entire partitioning portion and to suppress local concentration of the load on the partitioning portion. As a result, the performance of the partitioning portion can be easily maintained for a prolonged period of time.

Additionally, the auxiliary liquid chamber and the first limiting path may be arranged at the first mounting member such that the positions thereof in a circumferential direction of the first mounting member are different from each other.

In this case, since the auxiliary liquid chamber and the first limiting path are arranged on the first mounting member, the first pressure-receiving liquid chambers and the second pressure-receiving liquid chamber can be enlarged, compared to a case where the auxiliary liquid chamber and the first limiting path are arranged on the first mounting member. Therefore, when vibration is applied, it is possible to increase the amount of expansion/contraction of the first pressure-receiving liquid chambers and the second pressure-receiving liquid chamber. As a result, damping performance can be reliably exhibited.

Additionally, since the position of the auxiliary liquid chamber in the circumferential direction and the position of the first limiting path in the circumferential direction are different from each other, the auxiliary liquid chamber and the first limiting path can be arranged on the first mounting member in a state where the positions thereof in the radial direction of the first mounting member are equal to each other. Accordingly, it is possible to prevent an increase in the diameter of the first mounting member. As a result, enlargement of this vibration damping device can be suppressed.

Additionally, the auxiliary liquid chamber may be arranged side by side with the second pressure-receiving liquid chamber in the orthogonal direction. The first limiting path may extend in the circumferential direction, and communicates between the pair of first pressure-receiving liquid chambers through a side opposite to the auxiliary liquid chamber across the second mounting member in the orthogonal direction.

In this case, since the first limiting path extends in the circumferential direction and communicates between the pair of first pressure-receiving liquid chambers through the side opposite to the auxiliary liquid chamber across the second mounting member in the orthogonal direction, the flow passage length of the first limiting path can be easily secured while preventing enlargement of this vibration damping device. Therefore, the damping performance of vibration in the sandwiching direction can be effectively exhibited, for example, by securing the flow passage cross-sectional area of the first limiting path in conformity with the flow passage length of the first limiting path.

In addition, since the first limiting path extends in the circumferential direction, when the first mounting member is formed in a rectangular tubular shape, the flow passage length of the first limiting path can be more easily secured compared to a case where the first mounting member is formed in a cylindrical shape.

Additionally, the second limiting path may be arranged on the first mounting member, and extend in the circumferential direction, and may communicate between the auxiliary liquid chamber and the second pressure-receiving liquid chamber through a side opposite to the auxiliary liquid chamber across the second mounting member in the orthogonal direction.

In this case, since the second limiting path is arranged on the first mounting member, extends in the circumferential direction, and communicates between the auxiliary liquid chamber and the second pressure-receiving liquid chamber through the side opposite to the auxiliary liquid chamber across the second mounting member in the orthogonal direction, the flow passage length of the second limiting path can be easily secured while preventing enlargement of this vibration damping device. Therefore, the damping performance of vibration in the orthogonal direction can be effectively exhibited, for example, by securing the flow passage cross-sectional area of the second limiting path in conformity with the flow passage length of the second limiting path.

In addition, since the second limiting path extends in the circumferential direction, when the first mounting member is formed in a rectangular tubular shape, the flow passage length of the second limiting path can be more easily secured compared to a case where the first mounting member is formed in a cylindrical shape.

Additionally, an outer shell member that is fitted to the first mounting member from the outside may be further included. The first limiting path may be configured by a recessed groove formed in an outer peripheral surface of the first mounting member being blocked by an inner peripheral surface of the outer shell member. The outer shell member is split into a plurality of outer shell split bodies in the circumferential direction of the first mounting member.

In this case, the outer shell member is formed in a state where the outer shell member is fitted to the first mounting member from the outside by separately arranging the plurality of outer shell split bodies on the outer peripheral surface of the first mounting member, and combining the outer shell split bodies with each other.

Here, since the outer shell member is split into the plurality of outer shell split bodies in the circumferential direction, the outer shell split bodies can be adjusted in size in advance and formed so that the internal diameter of the outer shell member formed by combining the outer shell split bodies with each other becomes smaller than the external diameter of the first mounting member. Also, the inner peripheral surface of the outer shell member can be brought into pressure contact with the outer peripheral surface of the first mounting member without reducing the diameter of the outer shell member by forming the outer shell member, using the outer shell split bodies, in a state where the outer shell member is fitted to the first mounting member from the outside.

Meanwhile, for example, in a case where the outer shell member is reduced in diameter and thereby narrowed and fixed after the outer shell member is fitted to the first mounting member from the outside, it is difficult to perform uniform diameter reduction in the circumferential direction. However, according to this vibration damping device, it is easily possible to prevent a force, with which the inner peripheral surface of the outer shell member is brought into pressure contact with the outer peripheral surface of the first mounting member, from varying depending on the position in the circumferential direction. As a result, damping performance can be easily ensured by suppressing leakage of a liquid from the limiting paths.

Additionally, the first mounting member may include a base tube portion that has the elastic body anchored to an inner peripheral surface thereof; and an elastic covering body that is anchored to an outer peripheral surface of the base tube portion and is formed integrally with the elastic body. At least a portion of the recessed groove may be formed in the elastic covering body.

In this case, since at least a portion of the recessed groove is formed in the elastic covering body, it is possible to integrally mold the base tube portion, the elastic covering body, the second mounting member, and the elastic body within the same mold or the like. As a result, this vibration damping device can be simply formed at a low cost.

Additionally, as mentioned above, since the force with which the inner peripheral surface of the outer shell member is brought into pressure contact with the outer peripheral surface of the first mounting member can be prevented from varying depending on the position in the circumferential direction, deformation of the elastic covering body into an unintended shape can be suppressed even if the inner peripheral surface of the outer shell member is brought into pressure contact with the elastic covering body. Accordingly, it is possible to form the limiting paths with high precision. As a result, damping performance can be reliably and easily ensured.

Additionally, a stopper member coupled to any one of an inner peripheral surface of the first mounting member and an outer peripheral surface of the second mounting member may be disposed within the first mounting member. The stopper portion may abut the inner peripheral surface of the first mounting member and the outer peripheral surface of the second mounting member to regulate further displacement when both of the mounting members are relatively displaced in the sandwiching direction and when both of the mounting members are relatively displaced in the orthogonal direction.

In this case, since this vibration damping device includes the stopper portion, it is possible to suppress excessive deformation of the elastic body at the time vibration is applied. As a result, the performance of the elastic body can be reliably and easily maintained for a prolonged period of time.

Additionally, since the stopper portion is disposed within the first mounting member, the stopper portion can be provided to prevent this vibration damping device from becoming large.

Advantageous Effects of Invention

According to the vibration damping device related to the present invention, the performance of the elastic body can be easily maintained for a prolonged period of time.

DESCRIPTION OF EMBODIMENTS

A vibration damping device related to an embodiment of the present invention will be described below with reference to the drawings.

Figure 1:
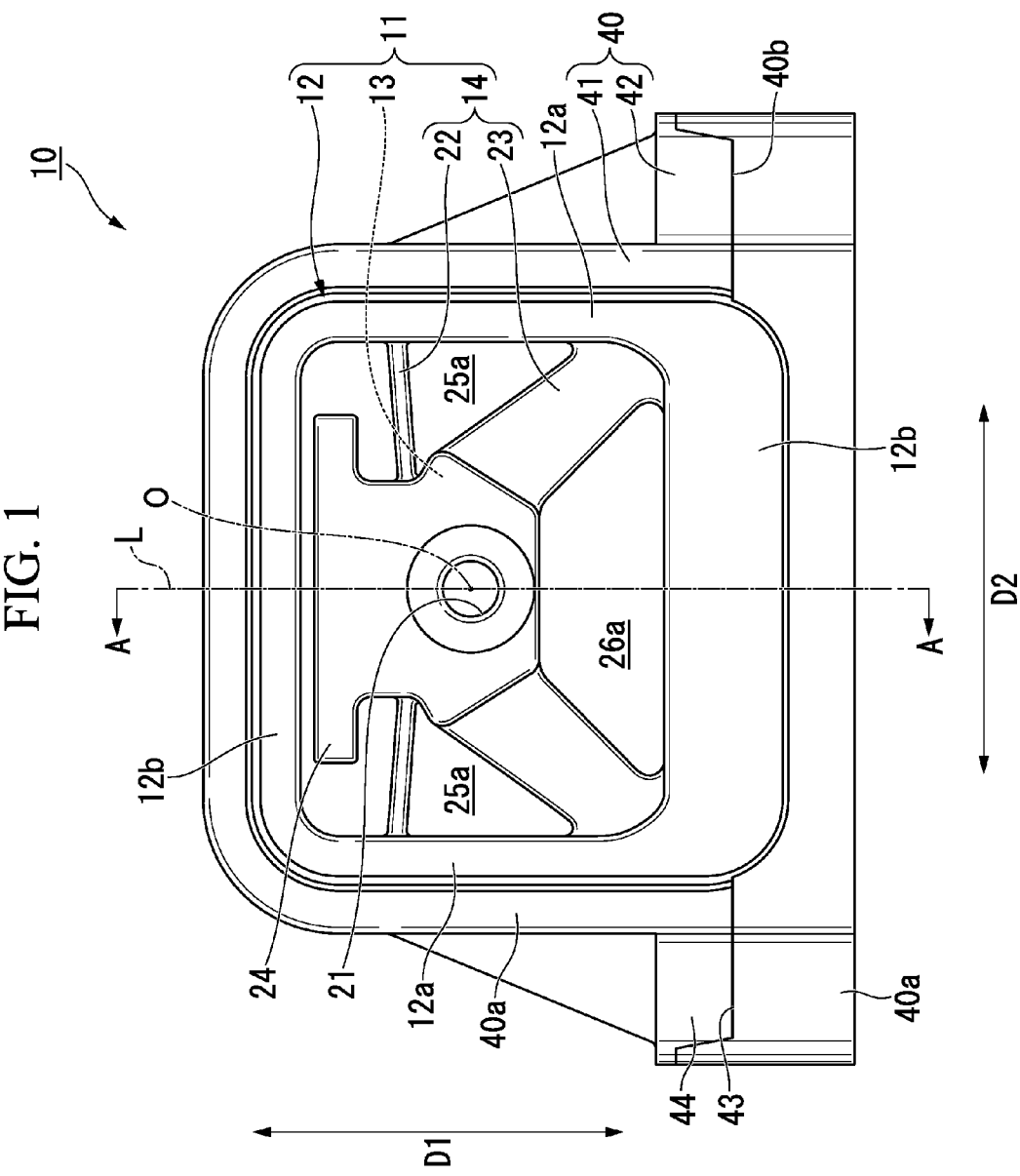
FIG. 1 is a front view of a vibration damping device related to an embodiment of the present invention.

As illustrated in FIG. 1, a vibration damping device 10 includes a vibration damping device body 11 and an outer shell member 40. The vibration damping device body 11 includes a first mounting member 12, a second mounting member 13, and an elastic body 14. The outer shell member 40 is fitted to the first mounting member 12 from the outside. In the vibration damping device 10, at least one of a vibration generating portion and a vibration receiving portion is coupled to the first mounting member 12 via the outer shell member 40, and the other is coupled to the second mounting member 13. The vibration damping device 10 is of a so-called liquid enclosed type in which, for example, ethylene glycol, water, silicone oil, or the like is enclosed as a liquid.

Here, the first mounting member 12 is formed in a tubular shape, and the outer shape of the vibration damping device body 11 is linearly symmetrically formed in a front view when the vibration damping device 10 is viewed from an axial direction D3 of the first mounting member 12, with a virtual line L passing through an axis O of the first mounting member 12 as a reference. In the following, a direction along the virtual line L is referred to as a first direction (orthogonal direction) D1, and a direction orthogonal to both the axis O and the virtual line L is referred to as a second direction (sandwiching direction) D2. Additionally, a direction orthogonal to the axis O is referred to as a radial direction, and a direction going around the axis O is referred to as a circumferential direction.

The first mounting member 12 is formed in a tubular shape that forms a rectangular shape in the front view. The first mounting member 12 includes a pair of first wall portions 12a that extend in the first direction D1 and are arranged at a predetermined distance in the second direction D2, and a pair of second wall portions 12b that extend in the second direction D2 and are arranged at a predetermined distance in the first direction D1. The pair of second wall portions 12b couple the ends of the pair of first wall portions 12a together in the second direction D2.

Figure 2:
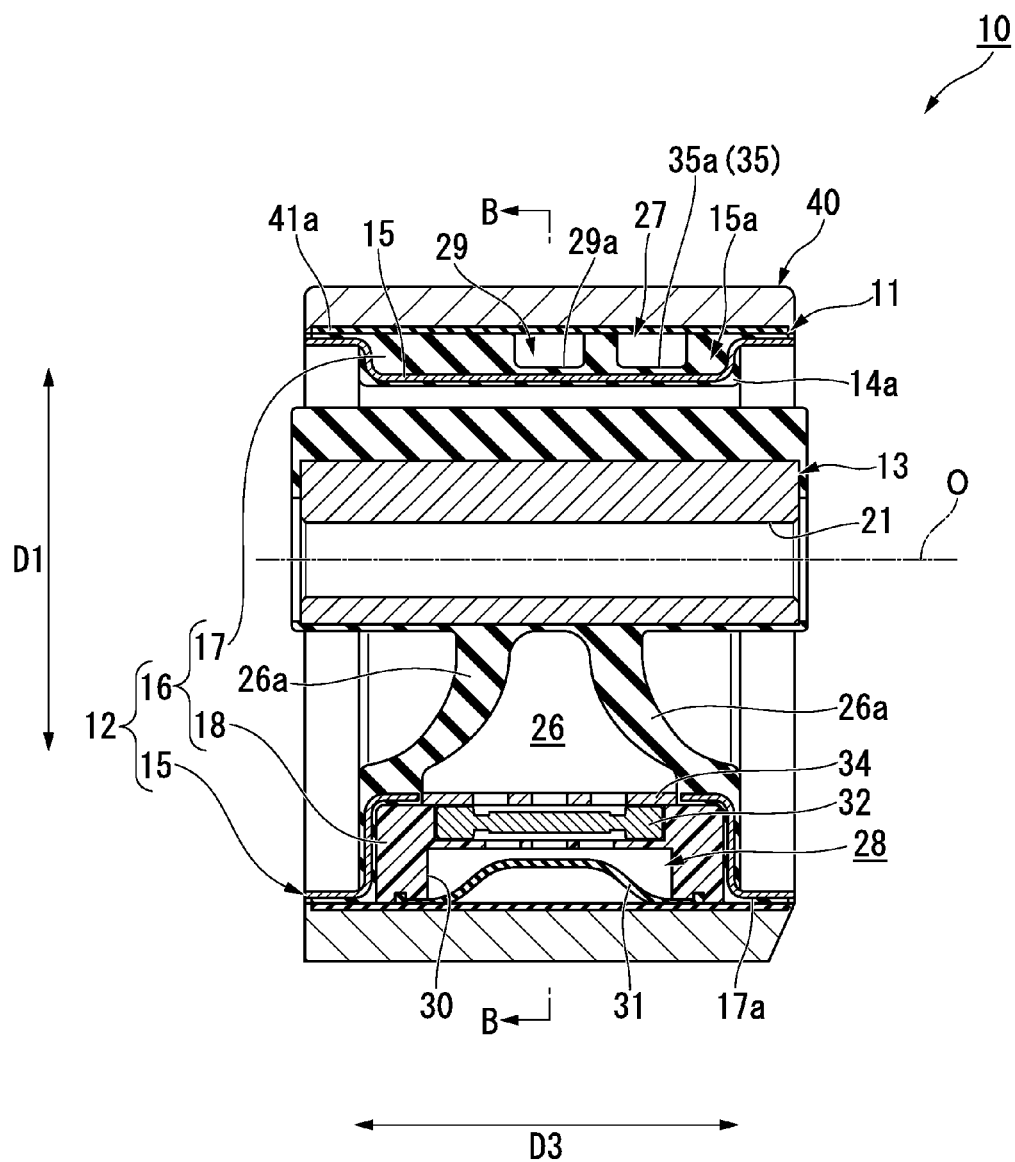
FIG. 2 is a cross-sectional view as seen in the direction of arrow A-A illustrated in FIG. 1.
Figure 3:
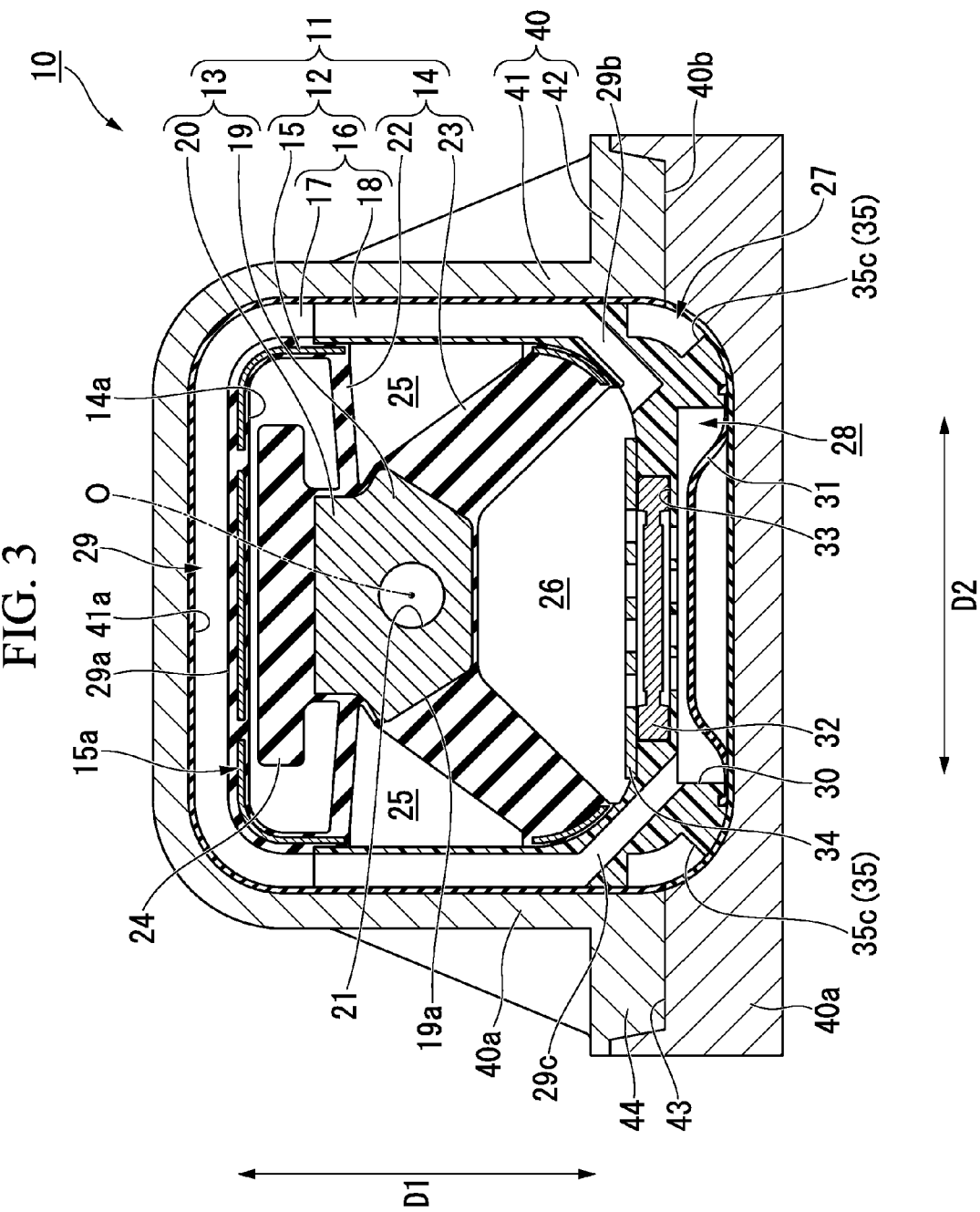
FIG. 3 is a cross-sectional view as seen in the direction of arrow B-B illustrated in FIG. 2.

As illustrated in FIGS. 2 and 3, the first mounting member 12 is constituted of a base tube portion 15 that has the elastic body 14 anchored to an inner peripheral surface thereof, and a tubular covering portion 16 that covers an outer peripheral surface of the base tube portion 15.

The base tube portion 15 is formed of, for example, a hard material, such as a metallic material. As illustrated in FIG. 2, the base tube portion 15 is provided with an annular recess 15a that extends over the entire circumference in the circumferential direction. Both ends of the base tube portions 15 in the axial direction D3 have larger diameters than a central portion located between both ends, and the central portion is reduced in diameter compared to both ends. The annular recess 15a is defined by the central portion of the base tube portion 15, and step portions of the base tube portion that couple the central portion and both ends in the axial direction D3.

Figure 6:
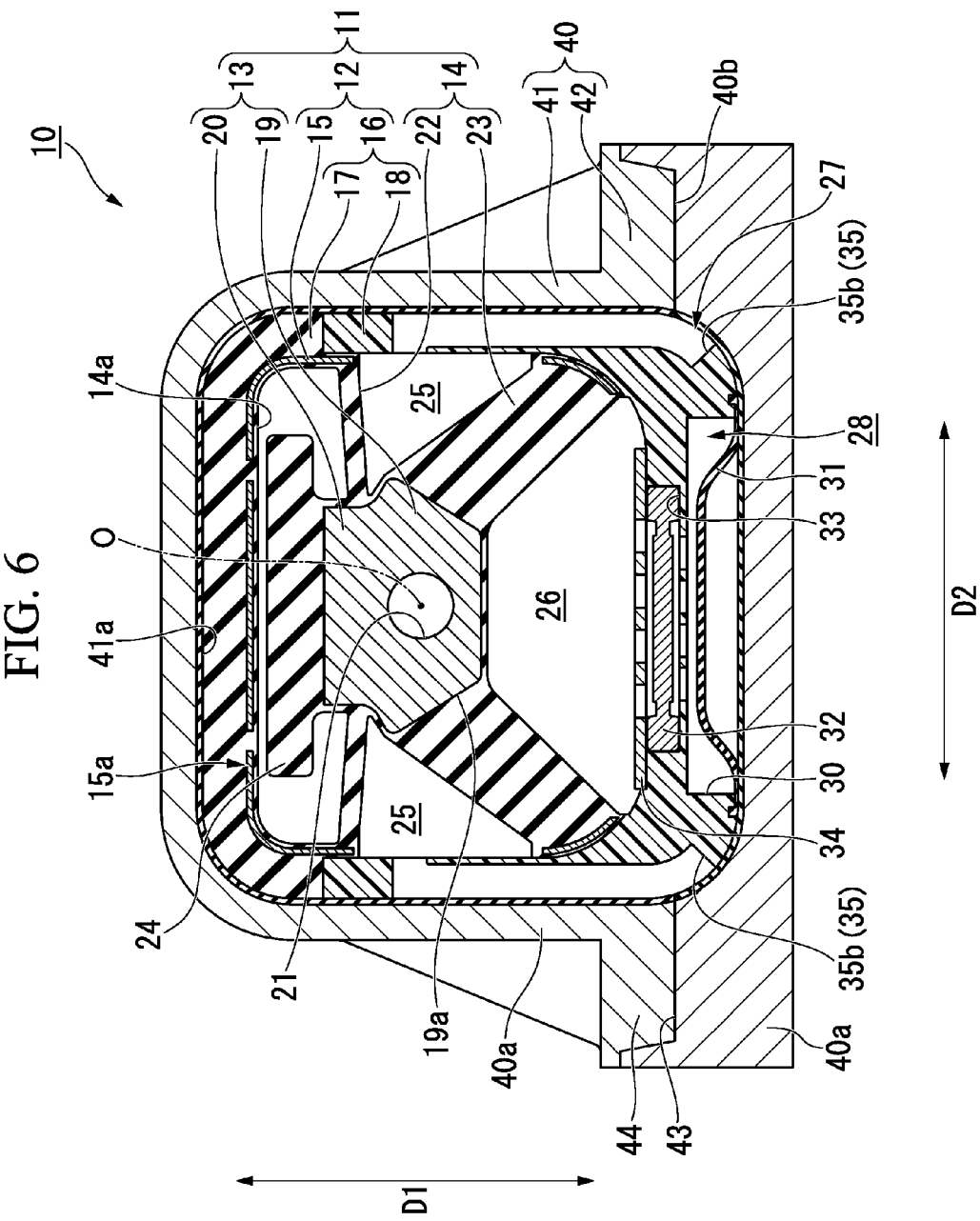
FIG. 6 is a cross-sectional view equivalent to a C-C cross-section illustrated in FIG. 5, in the vibration damping device illustrated in FIG. 1.

As illustrated in FIGS. 2 to 6, the tubular covering portion 16 is arranged in the annular recess 15a, and covers an outer peripheral surface of the central portion of the base tube portion 15 over the entire circumference. As illustrated in FIG. 6, the tubular covering portion 16 is constituted of an elastic covering body 17 and an orifice member 18. The elastic covering body 17 and the orifice member 18 are formed by the tubular covering portion 16 being split into two pieces in the first direction D1. In the following, an elastic covering body 17 side along the first direction D1 is referred to as an upper side, and an orifice member 18 side along the first direction D1 is referred to as a lower side.

The elastic covering body 17 is formed of, for example, an elastic material, such as rubber. The elastic covering body 17 is anchored to the outer peripheral surface of the base tube portion 15, and covers a portion of the outer peripheral surface. The elastic covering body 17 is formed like a film on the outer peripheral surface of the base tube portion 15. The elastic covering body 17 extends in the circumferential direction, and both the ends of the elastic covering body 17 in the circumferential direction are directed downward. The positions of both the ends of the elastic covering body 17 in the first direction D1 are equal to each other.

The orifice member 18 is provided separately from the elastic covering body 17, and is formed of, for example, a resin material or the like. The orifice member 18 is fitted to the base tube portion 15 from the outside. The orifice member 18 extends in the circumferential direction, and both ends of the orifice member 18 in the circumferential are directed upward. Both the ends of the orifice member 18 in the circumferential direction are respectively brought into pressure contact with or anchored to both ends of the elastic covering body 17 in the circumferential direction.

As illustrated in FIG. 2, the film thickness of the elastic covering body 17 and the plate thickness of the orifice member 18 are equal to the depth of the annular recess 15a. The size of the orifice member 18 in the axial direction D3 is equal to the size of the annular recess 15a in the axial direction D3, and the orifice member 18 is fitted into the annular recess 15a. Both ends of the elastic covering body 17 in the axial direction D3 are anchored to the step portions of the base tube portion 15, and the elastic covering body 17 fills a portion where the orifice member 18 is not contacted within the annular recess 15a.

In addition, in the illustrated example, an outer elastic film 17a integrally formed of the same material as the elastic covering body 17 is anchored to a position where the elastic covering body 17 is not contacted, on the outer peripheral surface of the base tube portion 15. In a modification example of the present invention, the outer elastic film 17a may not be provided.

The second mounting member 13 is formed of, for example, a hard material, such as a metallic material. The second mounting member 13 is formed in the shape of a shaft extending in the axial direction D3, and is inserted into the first mounting member 12. The size of the second mounting member 13 in the axial direction D3 is equal to the size of the first mounting member 12 in the axial direction D3.

The second mounting member 13 is formed with a mounting hole 21 that opens in the axial direction D3. The mounting hole 21 is arranged coaxially with the axis O. The mounting hole 21 passes through the second mounting member 13 in the axial direction D3. A mediating member (not illustrated) coupled to the vibration generating portion or the vibration receiving portion is mounted on the mounting hole 21.

As illustrated in FIG. 3, the second mounting member 13 includes a body portion 19 and an auxiliary portion 20. The size of the body portion 19 along the second direction D2 is made gradually smaller moving downward from above. A pair of lateral surfaces 19a of the body portion 19 that face both sides in the second direction D2 extend toward the inside in the second direction D2 moving downward from above, respectively. The lateral surface 19a extends to incline with respect to the first direction D1 in the front view. The auxiliary portion 20 protrudes upward from the body portion 19. The size of the auxiliary portion 20 along the second direction D2 is made to be equal irrespective of the position in the first direction D1.

The elastic body 14 couples the first mounting member 12 and the second mounting member 13. The elastic body 14 is integrally formed of, for example, a rubber material or the like, and is vulcanized and bonded to the inner peripheral surface of the first mounting member 12 and the outer peripheral surface of the second mounting member 13. The elastic body 14 is formed integrally with the elastic covering body 17, and the elastic body 14 and the elastic covering bodies 17 are coupled together via an inner elastic film 14a formed on the first mounting member 12. The inner elastic film 14a is formed at a position where the elastic body 14 is not contacted, on the inner peripheral surface of the base tube portion 15 of the first mounting member 12, and the elastic body 14, the inner elastic film 14a, and the elastic covering body 17 are integrally formed of the same material.

The elastic body 14 includes a pair of arm wall portions 22 and a pair of leg wall portions (partitioning portions) 23 that sandwich the second mounting member 13 in the second direction D2.

The arm wall portions 22 protrude in the second direction D2 from the auxiliary portion 20 of the second mounting member 13. The arm wall portions 22 linearly extend in the second direction D2 in the front view. Respective positions in the first direction D1 at both ends of the arm wall portions 22 in the second direction D2 become equal to each other.

The leg wall portions 23 are located below the arm wall portions 22. The leg wall portions 23 couple the lateral surfaces 19a of the second mounting member 13 and corner portions of the first mounting member 12 together. The leg wall portions 23 linearly extend in directions that incline with respect to both the first direction D1 and the second direction D2, in the front view. The leg wall portions 23 extend in the inclining directions from the corner portions of the first mounting member 12 and are coupled to the second mounting member 13, in the front view.

Here, a stopper portion 24 and a plurality of pressure-receiving liquid chambers (liquid chambers) 25 and 26 are provided within the first mounting member 12.

The stopper portion 24 regulates the relative displacements of the first mounting member 12 and the second mounting member 13 that are equal to or greater than predetermined amounts in the first direction D1 and the second direction D2. The stopper portion 24 is located above the second mounting member 13 and is coupled to the auxiliary portion 20 of the second mounting member 13. The stopper portion 24 is integrally formed of the same material as the elastic body 14. The stopper portion 24 is formed in the shape of a plate that extends in the second direction D2. An upper gap in the first direction D1 is provided between an upper surface of the stopper portion 24 and the inner peripheral surface of the first mounting member 12. Side gaps in the second direction D2 are separately provided between both end surfaces of the stopper portion 24 in the second direction D2 and the inner peripheral surface of the first mounting member 12.

The pressure-receiving liquid chambers 25 and 26 have the liquid enclosed therein, and portions of wall surfaces thereof are constituted of the elastic body 14. As illustrated in FIGS. 3 to 7, the pressure-receiving liquid chambers 25 and 26 include a pair of first pressure-receiving liquid chambers 25 that communicate with each other through a first limiting path 27, and a second pressure-receiving liquid chamber 26 that communicates with an auxiliary liquid chamber (liquid chamber) 28, in which the liquid is enclosed, through a second limiting path 29. The first pressure-receiving liquid chambers 25 and the second pressure-receiving liquid chamber 26 are partitioned in the circumferential direction by the leg wall portions 23 of the elastic body 14.

Figure 4:
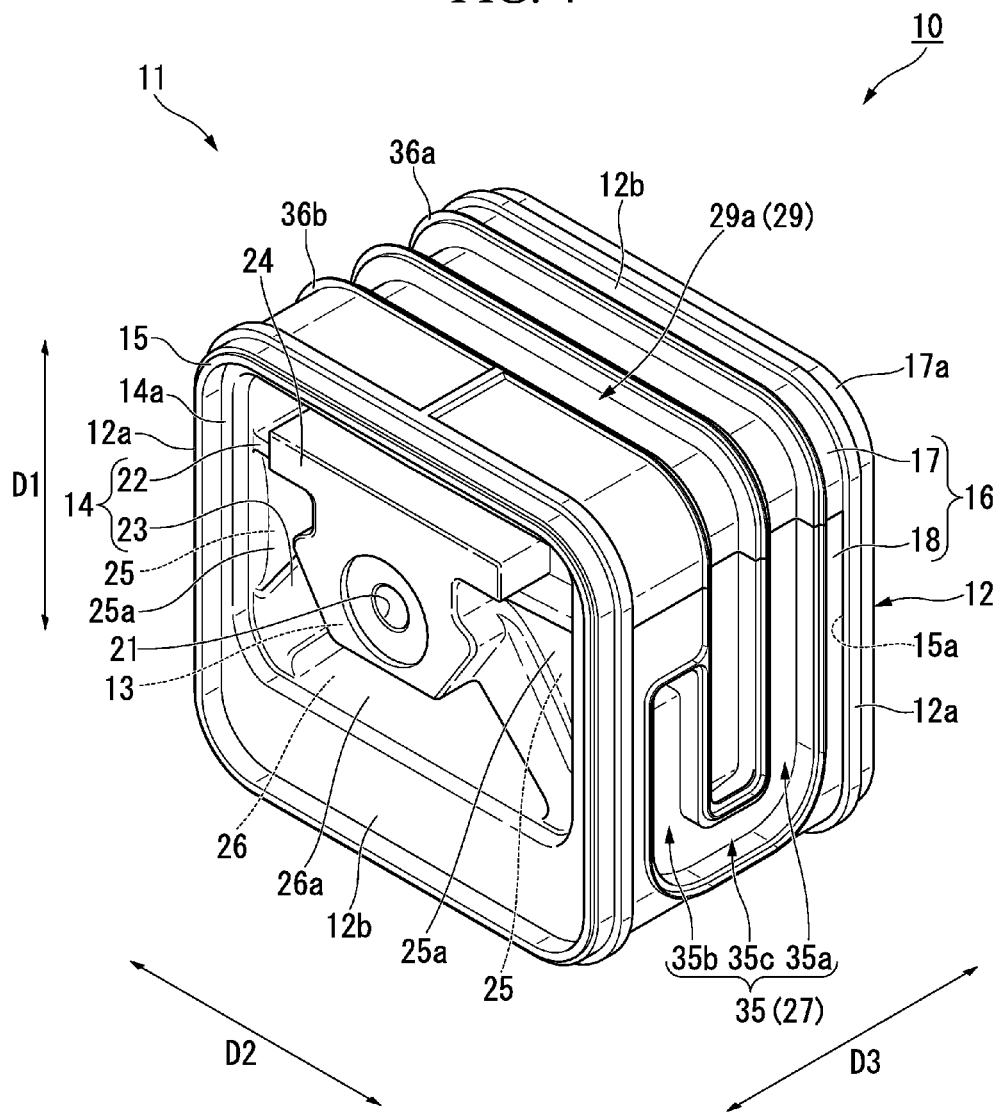
FIG. 4 is a perspective view of a vibration damping device body that constitutes the vibration damping device illustrated in FIG. 1.
Figure 5:
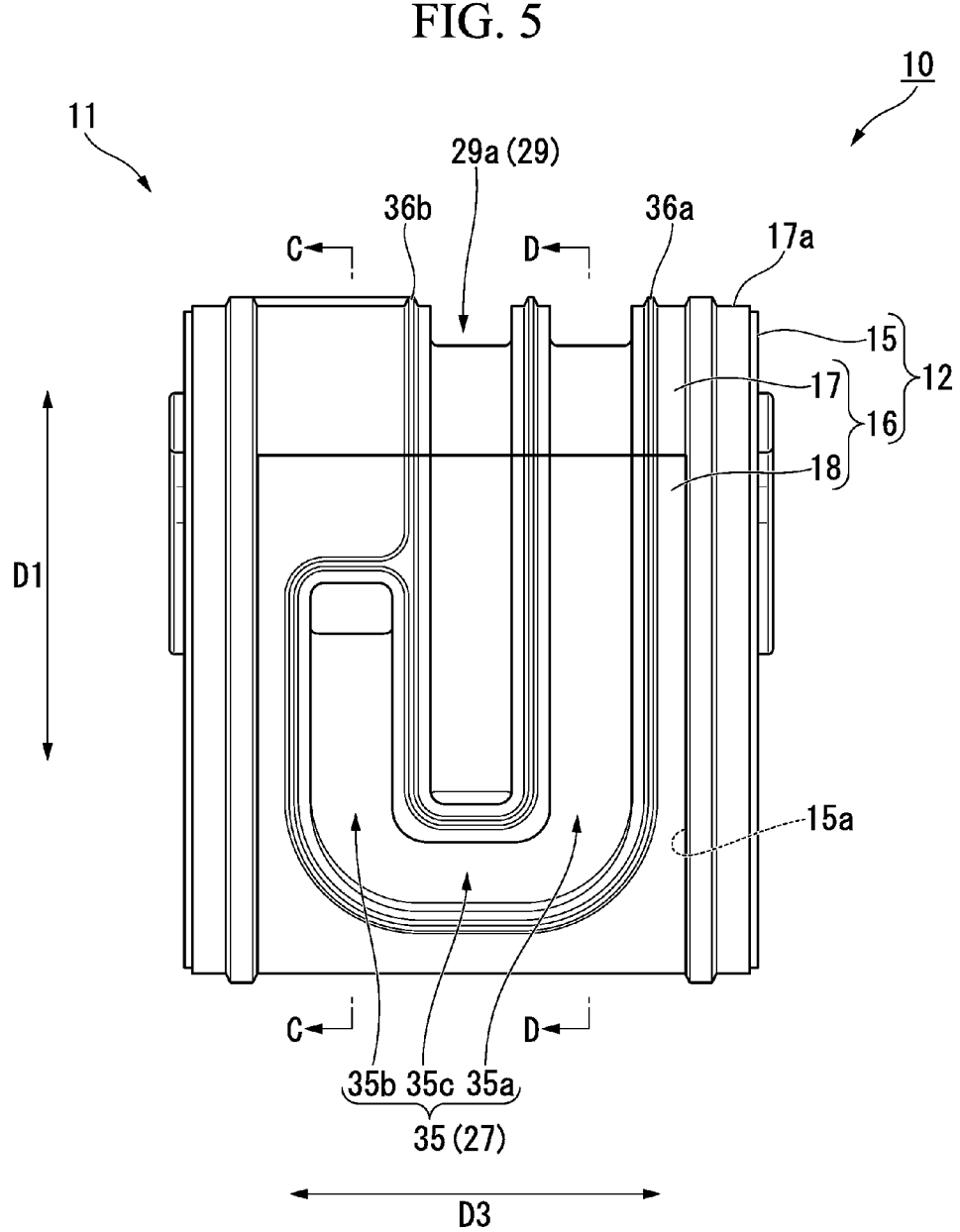
FIG. 5 is a side view of the vibration damping device body illustrated in FIG. 4.

As illustrated in FIGS. 3 and 4, the pair of first pressure-receiving liquid chambers 25 sandwich the second mounting member 13 in the second direction D2. Each first pressure-receiving liquid chamber 25 is formed by a space provided between the arm wall portion 22 and the leg wall portions 23 of the elastic body 14 being blocked by a pair of first blocking walls 25a from both sides of this space in the axial direction D3. The first blocking walls 25a are integrally formed of the same material as the arm wall portions 22 and the leg wall portions 23.

As illustrated in FIGS. 2 and 3, the second pressure-receiving liquid chamber 26 is arranged side by side by the second mounting member 13 in the first direction D1. The second pressure-receiving liquid chamber 26 is disposed below the second mounting member 13. The second pressure-receiving liquid chamber 26 is formed by a space provided between the pair of leg wall portions 23 being blocked by a pair of second blocking walls 26a from both sides of this space in the axial direction D3. The second blocking walls 26a are integrally formed of the same material as the leg wall portions 23.

The first blocking walls 25a and the second blocking walls 26a are located closer to the inside in the axial direction D3 than both end edges of the second mounting member 13 in the axial direction D3, and the second mounting member 13 extends over the entire length of each of the pair of first pressure-receiving liquid chambers 25 and the second pressure-receiving liquid chamber 26 in the axial direction D3.

The auxiliary liquid chamber 28, the first limiting path 27, and the second limiting path 29 are arranged on the first mounting member 12.

As illustrated in FIG. 3, the auxiliary liquid chamber 28 is arranged side by side with the second pressure-receiving liquid chamber 26 in the first direction D1. The auxiliary liquid chamber 28 includes a recess 30 for a liquid chamber that is formed in an outer peripheral surface of the first mounting member 12. The recess 30 for a liquid chamber opens downward, and the auxiliary liquid chamber 28 is configured by this recess 30 for a liquid chamber being blocked by a diaphragm member 31.

The diaphragm member 31 is formed of, for example, an elastic material, such as rubber, in the shape of an inverted bowl. An outer peripheral edge of the diaphragm member 31 is sandwiched by the outer peripheral surface of the first mounting member 12 and an inner peripheral surface of the outer shell member 40. The diaphragm member 31 is deformed and expanded/contracted according to the fluctuation of the liquid pressure of the auxiliary liquid chamber 28.

Here, a housing recess 33 in which the membrane member 32 is housed is provided between the auxiliary liquid chamber 28 and the second pressure-receiving liquid chamber 26. The housing recess 33 is formed in an inner peripheral surface of the tubular covering portion 16 of the first mounting member 12. The housing recess 33 opens upward and communicates with the auxiliary liquid chamber 28 through a plurality of communication holes formed in a bottom surface of the housing recess 33.

The housing recess 33 is adapted to be capable of communicating with the second pressure-receiving liquid chamber 26 through a second opening portion formed in the base tube portion 15 of the first mounting member 12. A presser plate 34 that regulates the separation of the membrane member 32 from the housing recess 33 is disposed within the second opening portion. The presser plate 34 covers the housing recess 33 from above and is fixed to the tubular covering portion 16 of the first mounting member 12. The presser plate 34 is formed with through-holes that communicate with the second pressure-receiving liquid chamber 26 and the housing recess 33.

The membrane member 32 is formed of, for example, an elastic material, such as rubber. A fluctuation in the liquid pressure in the second pressure-receiving liquid chamber 26 is exerted on the membrane member 32 through the through-hole.

The flow passage length and flow passage cross-sectional area of the second limiting path 29 are set (tuning) so that the resonant frequency of the second limiting path 29 becomes a predetermined frequency. This predetermined frequency includes, for example, the frequency of idling vibration (for example, the frequency thereof 18 Hz to 30 Hz and the amplitude thereof is ±0.5 mm or less), and the frequency of shaking vibration (for example, the frequency thereof is 14 Hz or less, and the amplitude thereof is greater than ±0.5 mm) which has a frequency lower than that of the idling vibration, or the like.

The second limiting path 29 extends in the circumferential direction. The second limiting path 29 communicates between the auxiliary liquid chamber 28 and the second pressure-receiving liquid chamber 26 through a side opposite to the auxiliary liquid chamber 28 across the second mounting member 13 in the first direction D1. The second limiting path 29 includes a depressed groove (groove portion) 29a that is formed in the outer peripheral surface of the first mounting member 12, a pressure-receiving communication portion 29b that allows one circumferential end in the depressed groove 29a and the second pressure-receiving liquid chamber 26 to communicate with each other therethrough, and a subsidiary communication portion 29c that allows the other circumferential end in the depressed groove 29a and the auxiliary liquid chamber 28 to communicate with each other therethrough. Also, the second limiting path 29 is configured by the depressed groove 29a of these portions being blocked by the inner peripheral surface of the outer shell member 40.

The depressed groove 29a is formed in an inverted U-shape in the front view. The positions of both circumferential ends of the depressed groove 29a of the first direction D1 become equal to each other. At least a portion of the depressed groove 29a is formed in the elastic covering body 17 of the first mounting member 12. A central portion of the depressed groove 29a in the circumferential direction is formed in the elastic covering body 17, and both the circumferential ends are arranged on the orifice member 18 of the first mounting member 12.

The pressure-receiving communication portion 29b is curved obliquely upward toward the inside in the second direction D2 after extending obliquely from one circumferential end in the depressed groove 29a toward the inside in the second direction D2. The pressure-receiving communication portion 29b communicates with the interior of the second pressure-receiving liquid chamber 26 through the second opening portion. The subsidiary communication portion 29c extends obliquely downward from the other circumferential end in the depressed groove 29a toward the inside in the second direction D2.

As illustrated in FIGS. 3 to 7, the flow passage length and flow passage cross-sectional area of the first limiting path 27 are set (tuning) so that the resonant frequency of the first limiting path 27 becomes a predetermined frequency.

Also, in the present embodiment, the first limiting path 27 does not contact the auxiliary liquid chamber 28. The position of the first limiting path 27 in the circumferential direction is different from the position of the auxiliary liquid chamber 28 in the circumferential direction. The first limiting path 27 extends in the circumferential direction. The first limiting path 27 communicates between the pair of first pressure-receiving liquid chambers 25 through the side opposite to the auxiliary liquid chamber 28 across the second mounting member 13 in the first direction D1.

The first limiting path 27 includes a recessed groove (groove portion) 35 that is formed in the outer peripheral surface of the first mounting member 12. The first limiting path 27 is configured by the recessed groove 35 being blocked by the inner peripheral surface of the outer shell member 40.

As illustrated in FIG. 4, the recessed groove 35 includes a main groove 35a and a subsidiary groove 35b that sandwich the depressed groove 29a of the second limiting path 29 in the axial direction D3, and a coupling groove 35c that couples the main groove 35a and the subsidiary groove 35b. The main groove 35a, the subsidiary groove 35b, and the depressed groove 29a are arranged side by side in the axial direction D3.

Figure 7:
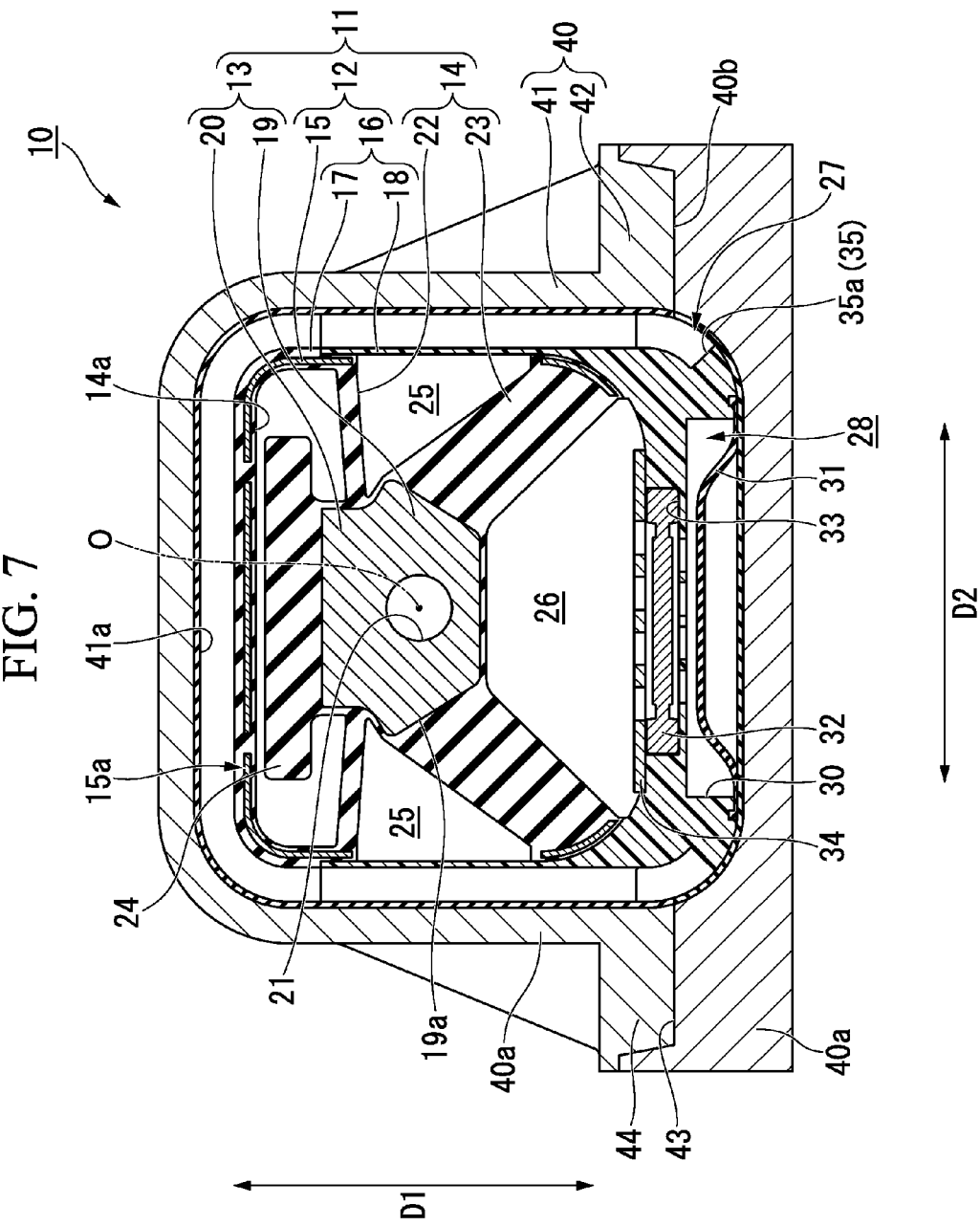
FIG. 7 is a cross-sectional view equivalent to a D-D cross-section illustrated in FIG. 5, in the vibration damping device illustrated in FIG. 1.

As illustrated in FIG. 7, the main groove 35a is formed in an inverted U-shape in the front view. The positions of both circumferential ends of the main groove 35a in the first direction D1 become equal to each other. At least a portion of the main groove 35a is formed in the elastic covering body 17 of the first mounting member 12. A central portion of the main groove 35a in the circumferential direction is formed in the elastic covering body 17, and both of the circumferential ends are arranged on the orifice member 18 of the first mounting member 12.

As illustrated in FIG. 6, a pair of the subsidiary grooves 35b are provided so as to face the second direction D2. The subsidiary grooves 35b are made to have substantially the same shape and substantially the same size, and linearly extend in the first direction D1. The subsidiary grooves 35b are provided in a limited manner in the orifice member 18 of the first mounting member 12. A peripheral end located on an upper side from the circumferential ends of each subsidiary groove 35b communicates with the first pressure-receiving liquid chamber 25 through a first opening portion that is formed in the base tube portion 15 of the first mounting member 12. As illustrated in FIG. 4, the coupling groove 35c extends in the axial direction D3, and couples circumferential ends of the main groove 35a and the subsidiary grooves 35b together. The coupling groove 35c is arranged below the depressed groove 29a.

Elastic seal ridges 36a and 36b that are compressed and deformed by the outer shell member 40 are erected from opening peripheral edges of the recessed groove 35 and the depressed groove 29a over the entire circumferences of the opening peripheral edges. The elastic seal ridges 36a and 36b are formed integrally with the first mounting member 12, and are formed integrally with the tubular covering portion 16 of the first mounting member 12, in the illustrated example.

The elastic seal ridges 36a and 36b include the first elastic seal ridge 36a that is provided at the opening peripheral edge of the recessed groove 35, and the second elastic seal ridge 36b that is provided at the opening peripheral edge of the depressed groove 29a. The portions of the elastic seal ridges 36a and 36b located between the recessed groove 35 and the depressed groove 29a are formed integrally with each other.

As illustrated in FIGS. 1 and 3, the outer shell member 40 includes a tubular outer shell body 41 that extends in the axial direction D3, and a coupling portion 42 that protrudes from an outer peripheral surface of the outer shell body 41. The outer shell body 41 is formed in a rectangular tubular shape. An elastic film 41a is anchored to an inner peripheral surface of the outer shell body 41, and the inner peripheral surface of the outer shell body 41 is brought into pressure contact with the outer peripheral surface of the first mounting member 12 via the elastic film 41a. A pair of the coupling portions 42 are arranged on both sides of the outer shell body 41 in the second direction D2. A coupling hole (not illustrated) that extends in the first direction D1 is formed in each coupling portion 42, and the outer shell member 40 is coupled to the vibration generating portion or the vibration receiving portion with, for example, a bolt to be inserted through the coupling hole.

Here, in the present embodiment, the outer shell member 40 is split into a plurality of outer shell split bodies 40a in the circumferential direction. The outer shell member 40 is split into two outer shell split bodies 40a. Both of the outer shell split bodies 40a are assembled to the first mounting member 12 from both sides in the first direction D1, and sandwich the vibration damping device body 11 in the first direction D1, respectively. A splitting surface 40b that splits the outer shell member 40 into the outer shell split bodies 40a extends in the second direction D2, and transverses the outer shell member 40 in the second direction D2 so as to pass through both of the coupling portions 42 of the outer shell member 40.

The plurality of outer shell split bodies 40a are fixed to each other by fixing means 43 and 44. The fixing means 43 and 44 are respectively formed at the coupling portions 42 of the two outer shell split bodies 40a by the splitting surface 40b. The fixing means 43 and 44 include the first fixing means 43 that is formed at the coupling portion 42 of one outer shell split body 40a of both of the outer shell split bodies 40a, and the second fixing means 44 that is formed at the coupling portion 42 of the other outer shell split body 40a. The first fixing means 43 is formed as a recess that opens toward the other outer shell split body 40a. The second fixing means 44 is formed as a protrusion that fits to the first fixing means 43. The first fixing means 43 does not open toward the outside in the second direction D2. The plurality of outer shell split bodies 40a are fixed by the fixing means 43 and 44 in each of the respective coupling portions 42 being crimped from the outside in the second direction D2.

The outer shell member 40 is formed in a state where the outer shell member is fitted to the first mounting member 12 from the outside by separately arranging the plurality of outer shell split bodies 40a on the outer peripheral surface of the first mounting member 12, and combining the outer shell split bodies with each other.

In addition, in the modification example of the present invention, the plurality of outer shell split bodies 40a may be fixed, for example, by being fixed with a screw, a rivet, or the like. In these cases, for example, screws or rivets may be adopted as the fixing means, and both of the coupling portions of the two outer shell split bodies may also be sandwiched in the first direction by the fixing means.

Additionally, in the modification example of the present invention, an elastic sealant may be arranged on the splitting surface 40b. This elastic sealant may be integrally formed of, for example, the same material as the elastic film 41a, or the elastic covering body 17 or the orifice member 18 of the first mounting member 12.

Here, the vibration damping device 10 as illustrated in FIG. 3 is of a compression type (upright type) in which the vibration damping device is mounted so that the second pressure-receiving liquid chamber 26 is located on the upper side in the vertical direction and the auxiliary liquid chamber 28 is located on the lower side in the vertical direction. When the vibration damping device 10 is mounted in, for example, an automobile, while the first mounting member 12 is coupled to an engine serving as the vibration generating portion via the outer shell member 40, the second mounting member 13 is coupled to a vehicle body serving as the vibration receiving portion via the mediating member. In addition, in the automobile, principal vibration in the vertical direction is apt to be applied from the engine to the vehicle body, and secondary vibration in the front-back direction or the left-right direction of the vehicle body is apt to be applied from the engine to the vehicle body. Thus, the vibration damping device 10 is mounted so that, for example the second direction D2 coincides with the front-back direction or the left-right direction, and the principal vibration is applied in the first direction D1, and the secondary vibration is applied in the second direction D2.

When the principal vibration is applied from the vibration generating portion to the vibration damping device 10, the first mounting member 12 and the second mounting member 13 are relatively displaced in the first direction D1 while the elastic body 14 is elastically deformed. Then, in this case, the second pressure-receiving liquid chamber 26 is expanded/contracted due to the relative displacement of the first mounting member 12 and the second mounting member 13, and the elastic deformation of the leg wall portions 23, or the like, and the liquid flows through the interior of the second limiting path 29 between the second pressure-receiving liquid chamber 26 and the auxiliary liquid chamber 28. Accordingly, liquid column resonance occurs within the second limiting path 29, and the vibration in a frequency equal to the frequency of the resonant frequency of the second limiting path 29 is absorbed and damped. Here, since the second mounting member 13 extends over the entire length of the second pressure-receiving liquid chamber 26 in the axial direction D3, the second pressure-receiving liquid chamber 26 is significantly deformed and expanded/contracted over the entire length thereof in the axial direction D3.

In addition, when the first mounting member 12 and the second mounting member 13 are relatively displaced in the first direction D1 in this way, the stopper portion 24 abuts the inner peripheral surface of the first mounting member 12, and the further relative displacement of both the mounting members 12 and 13 is regulated.

Additionally, when the secondary vibration is applied from the vibration generating portion to the vibration damping device 10, the first mounting member 12 and the second mounting member 13 are relatively displaced in the second direction D2 while the elastic body 14 is elastically deformed. As a result, the pair of first pressure-receiving liquid chambers 25 are separately expanded/contracted, and the liquid flows through the interior of the first limiting path 27. Accordingly, liquid column resonance occurs within the first limiting path 27, and the vibration in a frequency equal to the frequency of the resonant frequency of the first limiting path 27 is absorbed and damped. Here, since the second mounting member 13 extends over the entire length of the first pressure-receiving liquid chambers 25 in the axial direction D3, the first pressure-receiving liquid chambers 25 are significantly deformed and expanded/contracted over the entire length thereof in the axial direction D3.

In addition, when the first mounting member 12 and the second mounting member 13 are relatively displaced in the second direction D2 in this way, the stopper portion 24 abuts the inner peripheral surface of the first mounting member 12, and the further relative displacement of both the mounting members 12 and 13 is regulated.

As described above, according to the vibration damping device 10 applied to the present embodiment, the second mounting member 13 extends over the entire length of each of the pair of first pressure-receiving liquid chambers 25 and the second pressure-receiving liquid chamber 26 in the axial direction D3. Therefore, when vibrations in the first direction D1 and the second direction D2 are applied to the vibration damping device 10, the first mounting member 12 and the second mounting member 13 are relatively displaced in the first direction D1 and the second direction D2, so that the pressure-receiving liquid chambers 25 and 26 can be significantly deformed and expanded/contracted over the entire length thereof in the axial direction D3. Accordingly, it is possible to significantly and easily expand/contract the respective pressure-receiving liquid chambers 25 and 26 while preventing the local elastic deformation of the elastic body 14. As a result, a load applied to the elastic body 14 can be suppressed so as to maintain the performance of the elastic body 14 for a prolonged period of time.

Additionally, since the vibration damping device 10 includes the stopper portion 24, it is possible to suppress excessive deformation of the elastic body 14 at the time vibration is applied. As a result, the performance of the elastic body 14 can be reliably and easily maintained for a prolonged period of time.

Additionally, since the stopper portion 24 is disposed within the first mounting member 12, the stopper portion 24 can be provided to prevent the vibration damping device 10 from becoming large.

Additionally, since the leg wall portions 23 extend in the inclining directions from the first mounting member 12 in the front view and are coupled to the second mounting member 13, the leg wall portions 23 can be easily formed to be longer than those in a case where the leg wall portions 23 extend in the first direction D1 or the second direction D2. Accordingly, when the leg wall portions 23 are elastically deformed, it is possible to decentralize the loads applied to the leg wall portions 23 to the entire leg wall portions 23 and to suppress local concentration of the loads on the leg wall portions 23. As a result, the performance of the leg wall portions 23 can be easily maintained for a prolonged period of time.

Additionally, since the first limiting path 27 does not contact the auxiliary liquid chamber 28, the pair of first pressure-receiving liquid chambers 25 can communicate with each other through the first limiting path 27 alone without using the auxiliary liquid chamber 28. Accordingly, vibration having a large amplitude in the second direction D2 can be effectively and easily damped, compared to, for example, a case where the pair of first pressure-receiving liquid chambers communicate with each other through the first limiting path and the auxiliary liquid chamber, or the like.

Additionally, since the auxiliary liquid chamber 28 and the first limiting path 27 are arranged on the first mounting member 12, the auxiliary liquid chamber and the first limiting path can be enlarged, compared to a case where the first pressure-receiving liquid chambers 25 and the second pressure-receiving liquid chamber 26 are arranged on the first mounting member. Therefore, when vibration is applied, it is possible to increase the amount of expansion/contraction of the first pressure-receiving liquid chambers 25 and the second pressure-receiving liquid chamber 26. As a result, damping performance can be reliably exhibited.

Additionally, since the position of the auxiliary liquid chamber 28 in the circumferential direction and the position of the first limiting path 27 in the circumferential direction are different from each other, the auxiliary liquid chamber 28 and the first limiting path 27 can be arranged on the first mounting member 12 in a state where the positions thereof in the radial direction equal to each other. Accordingly, it is possible to prevent an increase in the diameter of the first mounting member 12. As a result, enlargement of the vibration damping device 10 can be suppressed.

Additionally, since the first limiting path 27 extends in the circumferential direction and communicates between the pair of first pressure-receiving liquid chambers 25 other through the side opposite to the auxiliary liquid chamber 28 across the second mounting member 13 in the first direction D1, the flow passage length of the first limiting path 27 can be easily secured while preventing enlargement of the vibration damping device 10. Therefore, the damping performance of vibration in the second direction D2 can be effectively exhibited, for example, by securing the flow passage cross-sectional area of the first limiting path 27 in conformity with the flow passage length of the first limiting path 27.

In addition, since the first limiting path 27 extends in the circumferential direction, when the first mounting member 12 is formed in a rectangular tubular shape as in the present embodiment, the flow passage length of the first limiting path 27 can be more easily secured compared to a case where the first mounting member is formed in a cylindrical shape.

Additionally, since the second limiting path 29 is arranged on the first mounting member 12, extends in the circumferential direction, and communicates between the auxiliary liquid chamber 28 and the second pressure-receiving liquid chamber 26 through the side opposite to the auxiliary liquid chamber 28 across the second mounting member 13 in the first direction D1, the flow passage length of the second limiting path 29 can be easily secured while preventing enlargement of the vibration damping device 10. Therefore, the damping performance of vibration in the first direction D1 can be effectively exhibited, for example, by securing the flow passage cross-sectional area of the second limiting path 29 in conformity with the flow passage length of the second limiting path 29.

In addition, since the second limiting path 29 extends in the circumferential direction, when the first mounting member 12 is formed in a rectangular tubular shape as in the present embodiment, the flow passage length of the second limiting path 29 can be more easily secured compared to a case where this first mounting member is formed in a cylindrical shape.

Additionally, since the first mounting member 12 includes the pair of first wall portions 12a, the ends of the first pressure-receiving liquid chambers 25 on the outside in the second direction D2 can be significantly extended in the first direction D1 so as to lie along the first wall portions 12a. Therefore, the first pressure-receiving liquid chambers 25 can be enlarged, compared to, for example, a case where the first mounting member is formed in a cylindrical shape having an internal diameter equal to the spacing between the pair of first wall portions. Accordingly, when vibration in the second direction D2 is applied, it is possible to increase the amount of expansion/contraction of the first pressure-receiving liquid chambers 25. As a result, damping performance can be reliably exhibited.

Additionally, since the first mounting member 12 includes the pair of second wall portions 12b, the ends of the second pressure-receiving liquid chamber 26 on the outside in the first direction D1 can be significantly extended in the second direction D2 so as to lie along the second wall portions 12b. Therefore, the second pressure-receiving liquid chamber 26 can be enlarged, compared to, for example, a case where the first mounting member is formed in a cylindrical shape having an internal diameter equal to the spacing between the pair of second wall portions. Accordingly, when vibration in the first direction D1 is applied, it is possible to increase the amount of expansion/contraction of the second pressure-receiving liquid chamber 26. As a result, damping performance can be reliably exhibited.

Moreover, since the first mounting member 12 includes the first wall portions 12a and the second wall portions 12b, the first direction D1 and the second direction D2 are easily identified. As a result, the handlability of the vibration damping device 10 can be improved.

Additionally, since the outer shell member 40 is split into the plurality of outer shell split bodies 40*a* in the circumferential direction, the outer shell split bodies 40*a* can be adjusted in size in advance and formed so that the internal diameter of the outer shell member 40 formed by combining the outer shell split bodies 40*a* with each other becomes smaller than the external diameter of the first mounting member 12. Also, the inner peripheral surface of the outer shell member 40 can be brought into pressure contact with the outer peripheral surface of the first mounting member 12 without reducing the diameter of the outer shell member 40 by forming the outer shell member 40, using the outer shell split bodies 40*a*, in a state where the outer shell member 40 is fitted to the first mounting member 12 from the outside.

Meanwhile, for example, in a case where the outer shell member is reduced in diameter and thereby narrowed and fixed after the outer shell member is fitted to the first mounting member from the outside, it is difficult to perform uniform diameter reduction in the circumferential direction. Particularly, as in the present embodiment, in a configuration in which the first mounting member 12 is formed in a rectangular tubular shape and includes the corner portions, rigidity differs at the corner portions and a planar portion. Therefore, it is very difficult to perform uniform diameter reduction in the circumferential direction.

In contrast, in the vibration damping device 10 applied to the present embodiment, it is easily possible to prevent a force, with which the inner peripheral surface of the outer shell member 40 is brought into pressure contact with the outer peripheral surface of the first mounting member 12, from varying depending on the position in the circumferential direction. As a result, damping performance can be easily ensured by suppressing leakage of a liquid from the limiting paths 27 and 29.

Moreover, since at least portions of the recessed groove 35 and the depressed groove 29*a* are formed in the elastic covering body 17, for example, it is possible to integrally mold the base tube portion 15, the elastic covering body 17, the second mounting member 13, and the elastic body 14 within the same mold. As a result, the vibration damping device 10 can be simply formed at a low cost.

Additionally, as mentioned above, since the force with which the inner peripheral surface of the outer shell member 40 is brought into pressure contact with the outer peripheral surface of the first mounting member 12 can be prevented from varying depending on the position in the circumferential direction, deformation of the elastic covering body 17 into an unintended shape can be suppressed even if the inner peripheral surface of the outer shell member 40 is brought into pressure contact with the elastic covering body 17. Accordingly, it is possible to form the limiting paths 27 and 29 with high precision. As a result, damping performance can be reliably and easily ensured.

Additionally, since the elastic seal ridges 36*a* and 36*b* that are compressed and deformed by the outer shell member 40 are erected from the opening peripheral edges of the recessed groove 35 and the depressed groove 29*a*, it is possible to reliably suppress leakage of a liquid from the limiting paths 27 and 29. As a result, damping performance can be further ensured reliably and easily.

In addition, the technical scope of the present invention is not limited to the aforementioned embodiment, and various changes can be made without departing from the concept of the present invention.

For example, the membrane member 32, the housing recess 33, the presser plate 34, the inner elastic film 14*a*, the outer elastic film 17*a*, and the elastic seal ridges 36*a* and 36*b* may not be provided.

Figure 8:
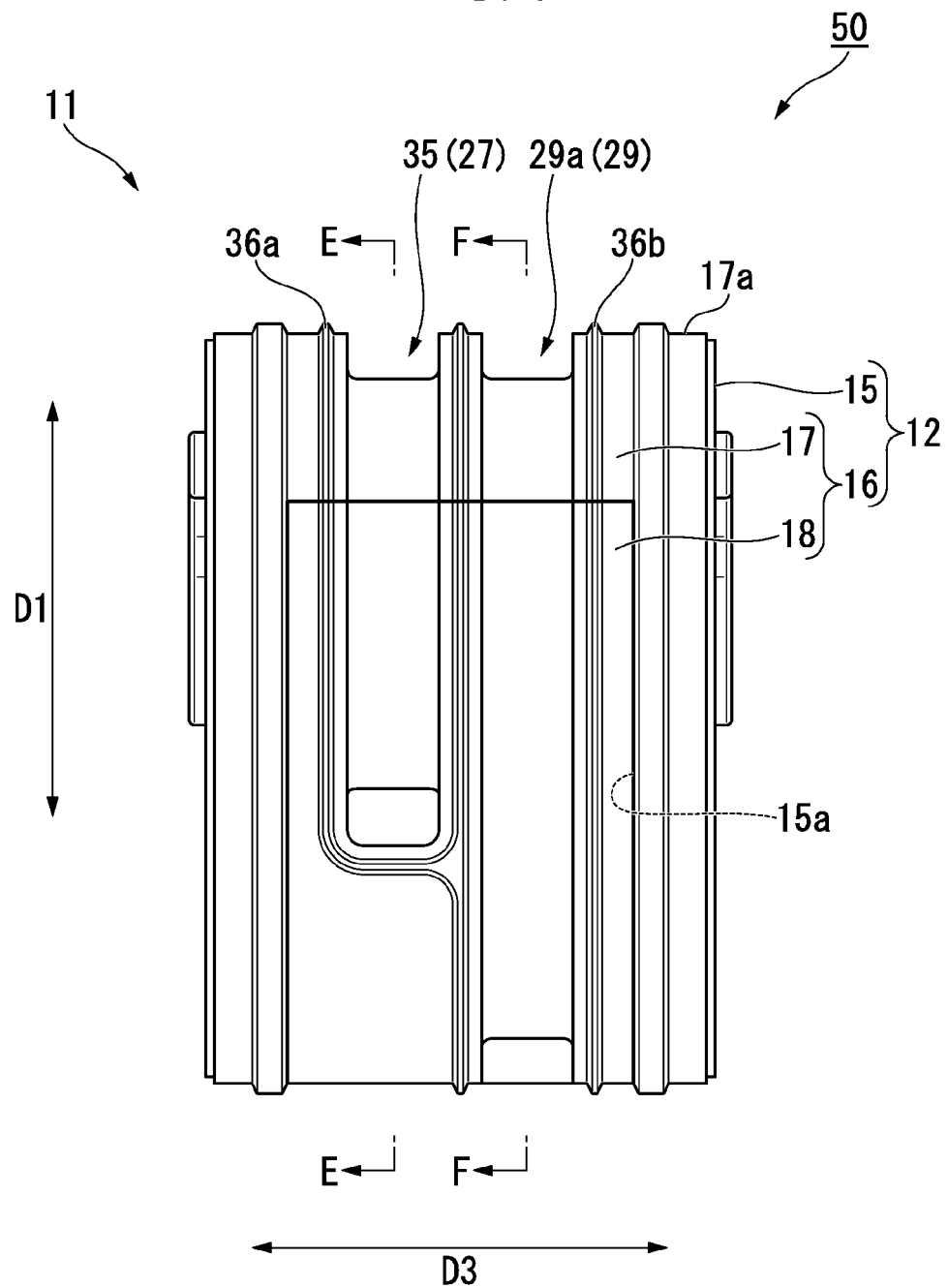
FIG. 8 is a side view of the vibration damping device body that constitutes a vibration damping device related to a modification example of the present invention.
Figure 9:
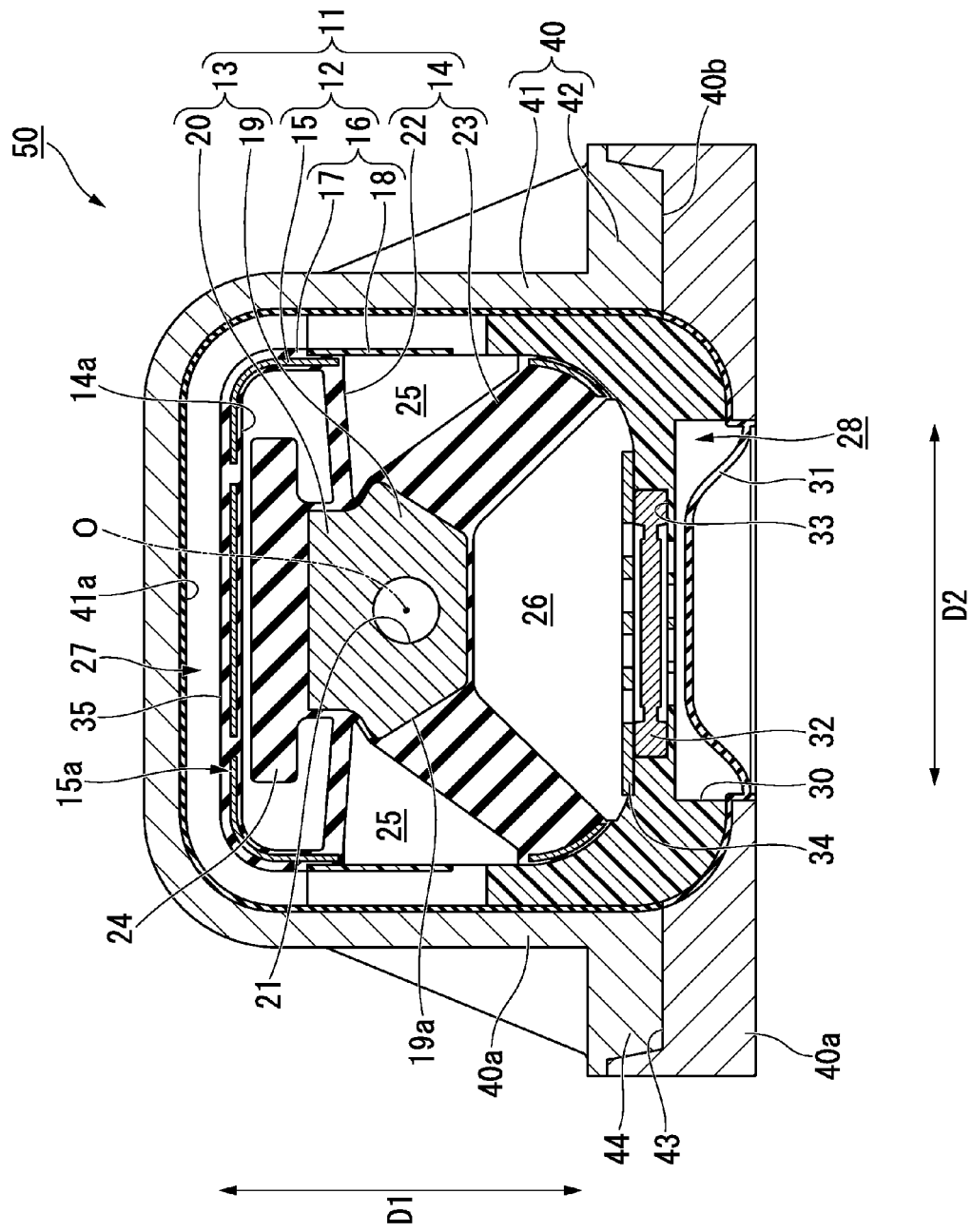
FIG. 9 is a cross-sectional view equivalent to an E-E cross-section illustrated in FIG. 8, in the vibration damping device related to the modification example of the present invention.
Figure 10:
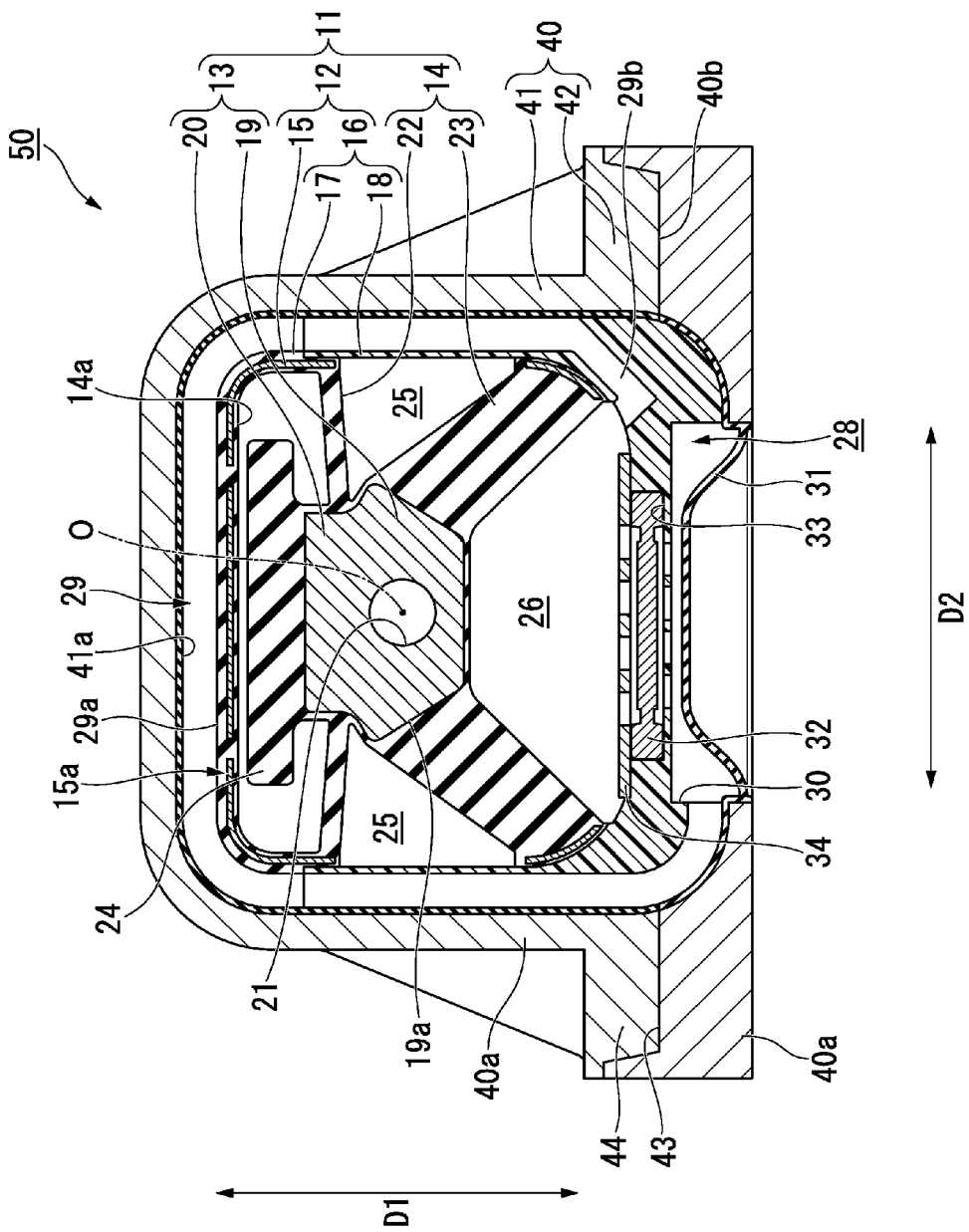
FIG. 10 is a cross-sectional view equivalent to an F-F cross-section illustrated in FIG. 8, in the vibration damping device related to the modification example of the present invention.

Additionally, the first limiting path 27 and the second limiting path 29 may be configured, for example, as in the first limiting path 27 and the second limiting path 29 in the vibration damping device 50 illustrated in FIGS. 8 to 10, without being limited to those illustrated in the aforementioned embodiment. As illustrated in FIG. 9, the recessed groove 35 of the first limiting path 27 is formed in an inverted U-shape in the front view, and both of the circumferential ends of the recessed groove 35 communicate with the first pressure-receiving liquid chambers 25 through the first opening portion. As illustrated in FIG. 10, in the depressed groove 29*a* of the second limiting path 29, the other circumferential end is directly connected to the auxiliary liquid chamber 28 without using the subsidiary communication portion. As illustrated in FIG. 8, the recessed grooves 35 and the depressed groove 29*a* are arranged side by side in the axial direction D3. In addition, in the vibration damping device 50, the diaphragm member 31 is integrally formed of the same material as the elastic film 41*a*.

Additionally, in the aforementioned embodiment, the elastic covering body 17 is integrally formed of the same material as the elastic body 14. However, the present invention is not limited to this. For example, the elastic covering body may be formed of an elastic body material which is different from the elastic body, integrally with or separately from the elastic body.

Additionally, in the aforementioned embodiment, the tubular covering portion 16 is constituted of the elastic covering body 17 and the orifice member 18. However, the present invention is not limited to this. For example, the tubular covering portion may be constituted only of the elastic covering body, or may be constituted only of the orifice member.

Moreover, in the aforementioned embodiment, portions of the recessed groove 35 and the depressed groove 29*a* are formed in the elastic covering body 17. However, the present invention is not limited to this. For example, the recessed groove and the depressed groove may be formed in the elastic covering body over the entire length thereof. Moreover, when the tubular covering portion is constituted only of the orifice member, or the like, the recessed groove and the depressed groove may not be formed in the orifice member over the entire length thereof, and may not be provided in the elastic covering body.

Additionally, in the aforementioned embodiment, the recessed groove 35 and the depressed groove 29*a* are formed in the tubular covering portion 16. However, the present invention is not limited to this. For example, the recessed groove and the depressed groove may be formed at the base tube portion.

Additionally, in the aforementioned embodiment, the outer shell member 40 is split into the two outer shell split bodies 40*a* in the circumferential direction. However, the present invention is not limited to this. For example, the outer shell member may be split into three or more split bodies. Moreover, for example, the outer shell member may not be split.

Moreover, in the aforementioned embodiment, the first limiting path 27 is configured by the recessed groove 35 formed in the outer peripheral surface of the first mounting member 12 being blocked by the inner peripheral surface of the outer shell member 40. However, the present invention is not limited to this. For example, the first limiting path may be formed as a non-opening on the outer peripheral surface of the first mounting member in the first mounting member.

Moreover, in the aforementioned embodiment, the second limiting path 29 is configured by the depressed groove 29a formed in the outer peripheral surface of the first mounting member 12 being blocked by the inner peripheral surface of the outer shell member 40. However, the present invention is not limited to this. For example, the second limiting path may be formed as a non-opening on the outer peripheral surface of the first mounting member in the first mounting member.

Furthermore, the outer shell member 40 may not be provided.

Additionally, in the aforementioned embodiment, the second limiting path 29 communicates between the auxiliary liquid chamber 28 and the second pressure-receiving liquid chamber 26 through the side opposite to the auxiliary liquid chamber 28 across the second mounting member 13 in the first direction D1. However, the present invention is not limited to this.

Moreover, in the aforementioned embodiment, the first limiting path 27 communicates between the pair of first pressure-receiving liquid chambers 25 through the side opposite to the auxiliary liquid chamber 28 across the second mounting member 13 in the first direction D1. However, the present invention is not limited to this. For example, the first limiting path may communicate between the pair of first pressure-receiving liquid chambers through the auxiliary liquid chamber side with respect to the second mounting member.

Additionally, in the aforementioned embodiment, the auxiliary liquid chamber 28 is arranged side by side with at the second pressure-receiving liquid chamber 26 in the first direction D1. However, the present invention is not limited to this. For example, the auxiliary liquid chamber may be arranged on the side opposite to the second pressure-receiving liquid chamber across the second mounting member in the first direction.

Moreover, in the embodiment, the auxiliary liquid chamber 28, the first limiting path 27, and the second limiting path 29 are arranged at the first mounting member 12. However, the present invention is not limited to this. For example, the auxiliary liquid chamber, the first limiting path, and the second limiting path may be arranged within the first mounting member.

Additionally, in the aforementioned embodiment, the positions of the auxiliary liquid chamber 28 and the first limiting path 27 in the circumferential direction are different from each other. However, the present invention is not limited to this. For example, the positions of the auxiliary liquid chamber and the first limiting path in the circumferential direction of the first mounting member may be equal to each other after the positions of the auxiliary liquid chamber and the first limiting path in the radial direction or the axial direction are made to be different from each other.

Additionally, in the aforementioned embodiment, the first mounting member 12 is formed in a rectangular tubular shape including the first wall portions 12a and the second wall portions 12b. However, the present invention is not limited to this. For example, the first mounting member may be formed in a cylindrical shape.

Additionally, in the aforementioned embodiment, the stopper portion 24 is coupled to the outer peripheral surface of the second mounting member 13. However, the present invention is not limited to this. For example, the stopper portion may be coupled to the inner peripheral surface of the first mounting member, and the stopper portion may abut the outer peripheral surface of the second mounting member to regulate further displacement when both of the mounting members are relatively displaced in the second direction and when both of the mounting members are relatively displaced in the first direction. Moreover, the stopper portion 24 may not be provided.

Additionally, in the aforementioned embodiment, the leg wall portions 23 extend in the directions that incline with respect to both the first direction D1 and the second direction D2 from the corner portion of the first mounting member 12 in the front view and are coupled to the second mounting member 13. However, the present invention is not limited to this. For example, the leg wall portions may extend in the first direction or the second direction.

Additionally, in the aforementioned embodiment, the compression type has been illustrated as the vibration damping device 10. However, the vibration damping device may be of a suspension type that is mounted so that the second pressure-receiving liquid chamber is located on a lower side in the vertical direction and the auxiliary liquid chamber is located on an upper side in the vertical direction.

Additionally, the vibration damping device 10 related to the present invention is not limited to being used in engine mounts for vehicles and can also be applied to other mounts. For example, the vibration damping device related to the present invention can also be applied to mounts of generators loaded on construction machines, or can also be applied to mounts of machines installed in factories or the like.

In addition, the constituent elements in the aforementioned embodiment can be substituted with well-known constituent elements without departing from the scope of the present invention, and the aforementioned embodiment may be combined appropriately.

INDUSTRIAL APPLICABILITY

The performance of the elastic body in the vibration damping device can be easily maintained for a prolonged period of time.

REFERENCE SIGNS LIST

10, 50: VIBRATION DAMPING DEVICE
11: VIBRATION DAMPING DEVICE BODY
12: FIRST MOUNTING MEMBER
12a: FIRST WALL PORTION
12b: SECOND WALL PORTION
13: SECOND MOUNTING MEMBER
14: ELASTIC BODY
15: BASE TUBE PORTION
17: ELASTIC COVERING BODY
25: FIRST PRESSURE-RECEIVING LIQUID CHAMBER (LIQUID CHAMBER)
26: SECOND PRESSURE-RECEIVING LIQUID CHAMBER (LIQUID CHAMBER)
27: FIRST LIMITING PATH
28: AUXILIARY LIQUID CHAMBER (LIQUID CHAMBER)
29: SECOND LIMITING PATH
29a: DEPRESSED GROOVE (GROOVE PORTION)
35: RECESSED GROOVE (GROOVE PORTION)
40: OUTER SHELL MEMBER
40a: OUTER SHELL SPLIT BODY

The invention claimed is:
1. A vibration damping device comprising:
a tubular first mounting member that is coupled to any one of a vibration generating portion and a vibration receiving portion;

a second mounting member that is coupled to the other of the vibration generating portion and the vibration receiving portion and is inserted through the first mounting member; and an elastic body that is coupled to both of the mounting members, wherein a plurality of pressure-receiving liquid chambers, in which a liquid is enclosed and of which portions of wall surfaces are constituted of the elastic body, are disposed within the first mounting member, wherein the pressure-receiving liquid chambers have a pair of first pressure-receiving liquid chambers that communicate with each other through a first limiting path and a second pressure-receiving liquid chamber that communicates with an auxiliary liquid chamber, in which the liquid is enclosed, through a second limiting path, wherein the pair of first pressure-receiving liquid chambers sandwich the second mounting member therebetween, wherein the second pressure-receiving liquid chamber is arranged side by side with the second mounting member in an orthogonal direction orthogonal to both an axial direction of the first mounting member and a sandwiching direction in which the pair of first pressure-receiving liquid chambers sandwich the second mounting member, wherein the second mounting member extends over the entire length of each of the pair of first pressure-receiving liquid chambers and the second pressure-receiving liquid chamber in the axial direction, and wherein the first limiting path does not contact the auxiliary liquid chamber.

2. The vibration damping device according to claim 1, wherein the first mounting member includes:

a pair of first wall portions that extend in the orthogonal direction and are arranged at a predetermined distance in the sandwiching direction; and a pair of second wall portions that extend in the sandwiching direction, which are arranged at a predetermined distance in the orthogonal direction, and couple ends of the pair of first wall portions in the orthogonal direction.

3. The vibration damping devices according to claim 2, wherein the auxiliary liquid chamber and the first limiting path are arranged on the first mounting member such that the positions thereof in a circumferential direction of the first mounting member are different from each other.

4. The vibration damping device according to claim 3, wherein the auxiliary liquid chamber is arranged side by side with the second pressure-receiving liquid chamber in the orthogonal direction, and wherein the first limiting path extends in the circumferential direction, and communicates between the pair of first pressure-receiving liquid chambers through a side opposite to the auxiliary liquid chamber across the second mounting member in the orthogonal direction.

5. The vibration damping device according to claim 4, wherein the second limiting path is arranged on the first mounting member, extends in the circumferential direction, and communicates between the auxiliary liquid chamber and the second pressure-receiving liquid chamber through a side opposite to the auxiliary liquid chamber across the second mounting member in the orthogonal direction.

6. The vibration damping devices according to claim 1, wherein the auxiliary liquid chamber and the first limiting path are arranged on the first mounting member such that the positions thereof in a circumferential direction of the first mounting member are different from each other.

7. The vibration damping device according to claim 6, wherein the auxiliary liquid chamber is arranged side by side with the second pressure-receiving liquid chamber in the orthogonal direction, and wherein the first limiting path extends in the circumferential direction, and communicates between the pair of first pressure-receiving liquid chambers through a side opposite to the auxiliary liquid chamber across the second mounting member in the orthogonal direction.

8. The vibration damping device according to claim 7, wherein the second limiting path is arranged on the first mounting member, extends in the circumferential direction, and communicates between the auxiliary liquid chamber and the second pressure-receiving liquid chamber through a side opposite to the auxiliary liquid chamber across the second mounting member in the orthogonal direction.

9. The vibration damping device according to claim 1, further comprising:

an outer shell member that is fitted to the first mounting member from the outside, wherein the first limiting path is configured by a recessed groove formed in an outer peripheral surface of the first mounting member being blocked by an inner peripheral surface of the outer shell member, and wherein the outer shell member is split into a plurality of outer shell split bodies in the circumferential direction of the first mounting member.

10. The vibration damping device according to claim 9, wherein the first mounting member includes a base tube portion that has the elastic body anchored to an inner peripheral surface thereof; and an elastic covering body that is anchored to an outer peripheral surface the base tube portion and is formed integrally with the elastic body, and wherein at least a portion of the recessed groove is formed in the elastic covering body.

* * * * *